United States Patent
Snider

(10) Patent No.: US 8,812,418 B2
(45) Date of Patent: Aug. 19, 2014

(54) MEMRISTIVE ADAPTIVE RESONANCE NETWORKS

(75) Inventor: Gregory S. Snider, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 13/256,246

(22) PCT Filed: Jun. 22, 2009

(86) PCT No.: PCT/US2009/048178
§ 371 (c)(1),
(2), (4) Date: Sep. 13, 2011

(87) PCT Pub. No.: WO2010/151247
PCT Pub. Date: Dec. 29, 2010

(65) Prior Publication Data
US 2012/0016829 A1    Jan. 19, 2012

(51) Int. Cl.
*G06N 3/063* (2006.01)
*G06N 3/04* (2006.01)

(52) U.S. Cl.
CPC ............................... *G06N 3/063* (2013.01)
USPC .......................................................... 706/27

(58) Field of Classification Search
USPC ................................................... 706/27, 33
See application file for complete search history.

(56) References Cited

U.S. PATENT DOCUMENTS

| | | | | |
|---|---|---|---|---|
| 5,214,715 A | * | 5/1993 | Carpenter et al. | 382/157 |
| 6,741,568 B1 | * | 5/2004 | Barillaud | 370/252 |
| 6,999,953 B2 | * | 2/2006 | Ovhsinsky | 706/39 |
| 8,250,010 B2 | * | 8/2012 | Modha et al. | 706/25 |
| 2002/0099702 A1 | * | 7/2002 | Oddo | 707/6 |
| 2008/0258767 A1 | * | 10/2008 | Snider et al. | 326/46 |
| 2009/0292661 A1 | * | 11/2009 | Haas | 706/33 |
| 2010/0223220 A1 | * | 9/2010 | Modha et al. | 706/33 |
| 2010/0299297 A1 | * | 11/2010 | Breitwisch et al. | 706/33 |
| 2011/0228593 A1 | * | 9/2011 | Strukov | 365/148 |
| 2011/0248381 A1 | * | 10/2011 | Tong et al. | 257/537 |

OTHER PUBLICATIONS

Snider G., "Spike-Timing-Dependent Learning in Memristive Nanodevices", 2008 IEEE/ACM International Symposium on Nanoscale Architectures (NANOARCH 2008), Jun. 12-13, 2008, pp. 85-92.*
Strukov D. et al., "The missing memristor found", Nature, vol. 453, May 1, 2008, pp. 80-83.*
Snider G., "Self-organized computation with unreliable, memristive nanodevices", Nanotechnology, 18, 2007, pp. 1-13.*
Snider, G.S. "Cortical Computing with Memristive Nanodevices" magazine of Scidac Review, Winter 2008, pp. 58-65.

* cited by examiner

*Primary Examiner* — Jeffrey A Gaffin
*Assistant Examiner* — Dave Misir

(57) ABSTRACT

A method for implementing an artificial neural network includes connecting a plurality of receiving neurons to a plurality of transmitting neurons through memristive synapses. Each memristive synapse has a weight which is initialized into a conductive state. A binary input vector is presented through the memristive synapses to the plurality of receiving neurons and the state of one or more of the memristive synapses modified based on the binary input vector.

15 Claims, 8 Drawing Sheets

MEMRISTIVE ADAPTIVE RESONANCE NETWORKS

BACKGROUND

Artificial neural networks attempt to replicate the structure and/or function of biological neural networks. Biological neural networks typically include a number of neurons which are interconnected by chemical synapses. These chemical synapses are specialized junctions through which neurons transmit signals within the biological neural network. The combination of neurons and synapses provide for biological computations that underlie perceptions, thought, and learning. As the biological neural network is exposed to an input stimulus, some of the neurons and/or synapses undergo a self-learning process using locally available information. This self learning allows the network to adapt to new stimulus while retaining a memory of previous stimulus.

Implementing an artificial neural network within a computer architecture can be challenging. The elementary components of a silicon based computer, the capacitor, resistor, inductor and transistor, do not have intrinsic memory capabilities analogous to neurons or synapses. Consequently, many existing artificial neural networks rely on complex hardware implementations or software simulations. Another difference between biological neural networks and artificial neural networks is that while neural networks use locally available information, artificial neural networks typically rely on one or more global variables. These and other limitations have resulted in artificial neural networks which are complex, resource intensive, and have limited capabilities.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
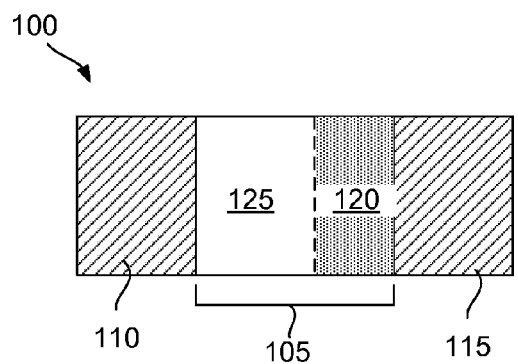
FIGS. 1A-1D show basic operating principles of an illustrative two-terminal memristive device, according to one embodiment of principles described herein.

Adaptive resonance theory (ART) networks are designed to learn new memories in response to environmental stimuli without disrupting old memories. ART networks can take a variety of forms including nonlinear, dynamical systems or iterative algorithms which facilitate implementation on a digital computer. ART networks are attractive for hardware implementation because of their inherent parallelism and local communication.

According to one illustrative embodiment, an ART network can be implemented as an electronic circuit using memristive devices for synapses, and a combination of conventional analog components plus memristive devices for neurons. Memristive devices are a new type of component which retains a memory of past conditions. Throughout the specification, this implementation is called "mART" where the "m" refers to memristive components used in the implementation. The mART network is distinct from other ART implementations in a number of ways, including physical structure and operation.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

According to one illustrative embodiment, a memristive device may be a programmable resistor or "memristor." A memristor is the fourth fundamental circuit element, joining the capacitor, resistor, and inductor. The term "memristor" is derived from the combination of the two terms "memory" and "resistor." The memristor has properties that cannot be duplicated by the combination of the other fundamental circuit elements. Unlike the other fundamental circuit elements, the memristor carries a memory of past electrical fields which have been applied. As described in U.S. Patent App. Pub. No. 2008/0079029, entitled "Multi-terminal Electrically Actuated Switch" and U.S. Patent App. Pub. No. 2008/0090337, entitled "Electrically Actuated Switch", both to R. Stanley Williams, which are hereby incorporated in their entirety, memristor devices are based on dopant motion within a matrix material. Specifically, when an electrical field of sufficient magnitude is applied to a memristor, the dopants within the matrix material are displaced. When the electrical field is removed from the circuit, the displacement of the dopants allows the memristor to "remember" how much voltage was previously applied and for how long. The motion of these dopants alters the electrical resistance of the memristor. The dopants remain in this displaced state over long periods of time, thereby retaining a memory of the past electrical fields applied to the device. Until another electrical field is applied to the memristor which has sufficient intensity or duration to induce dopant motion, the resistance characteristics of the memristor are stable.

Memristors could be used in a variety of applications including data storage, circuit calibration, fuzzy logic, or neural networks which share fundamental functionalities with the human brain. In some circumstances, the flexibility in using memristive devices can be significantly enhanced by integrating them with other conventional electronic elements in an integrated circuit.

FIG. 1A shows an illustrative two-terminal memristive device (100). According to one embodiment, the two-terminal memristive device (100) is comprised of a first electrode (110) and second electrode (115) which are in electrical and physical contact with the memristive matrix (105). The memristive matrix (105) is comprised of an intrinsic semiconducting material (125) which is not intentionally doped and a highly doped secondary region (120). Throughout the specification and appended claims, the term "memristive matrix" describes a thin film of material that is electronically semiconducting or nominally electronically insulating and also a weakly ionic conductor. The memristive matrix is capable of transporting and hosting ions that act as dopants to control the flow of electrons through the memristive device. According to one illustrative embodiment, the basic mode of operation is to apply an electrical field (the drift field, which may exceed some threshold for enabling the motion of the ions in the memristive matrix) across the memristive device large enough to cause an ionic species to be transported within the memristive matrix via ionic transport. The ionic species are specifically chosen from those that act as electrical dopants for the memristive matrix, and thereby change the electrical conductivity of the matrix from low conductivity (i.e. not intentionally doped semiconductor or insulator—switch-OFF configuration) to high conductivity (doped to provide a higher conductivity—switch-ON configuration) or from high electrical conductivity to low conductivity (switch-ON to switch-OFF). Furthermore, the memristive matrix and the dopant species are chosen such that the drift of the dopants within the memristive matrix is possible but not too facile, to ensure that the memristive device will remain in whatever state it is set for a reasonably long time, perhaps many years at room temperature. This ensures that the memristive device is nonvolatile, that is, that it holds its state after the drift field has been removed.

The matrix material may be a thin film (generally less than 50 nm thick), and is in many cases nanocrystalline, nanoporous, or amorphous. Also, because the film is so thin, the amount of time required to drift enough dopants into or out of a local region of the film to substantially change its conductivity is relatively rapid. Another advantage of nanometer scale memristive devices is that a large electrical field can be produced by a relatively small applied voltage. For example, a dopant may require an electrical field intensity of 100,000 volts per centimeter to move within the matrix. If the distance between two electrodes is 100 nanometers, only a voltage bias of 1 Volt will produce the required electrical field intensity.

One of these properties of the matrix material is that it is a weakly ionic conductor. The definition of a weakly ionic conductor is based on the application for which a memristive device is designed. The mobility and the diffusion constant for a species in a lattice are directly proportional to one another, via the "Einstein relation". Thus, if the mobility of ionized species in a lattice is very high, so is the diffusion constant. In general, it is desired for a memristive device to stay in a particular state, ON or OFF, for an amount of time that may range from a fraction of a second to years, depending on the application. Thus, the diffusion constant for such a device is, in an embodiment, low enough to ensure the desired level of stability, to avoid inadvertently turning the device from ON to OFF or vice versa via ionized species diffusion, rather than by intentionally setting the state of the memristive device with a voltage pulse. Therefore, a "weakly ionic conductor" is one in which the ion mobility, and thus the diffusion constant, is small enough to ensure the stability of the state of the device for as long as necessary under the desired conditions (e.g., the device does not change state because of diffusion of the dopants). "Strongly ionic conductors" would have large ionized species mobilities and thus would not be stable against diffusion.

According to one embodiment, the memristive matrix (105) may be initially comprised of two separate materials or layers. A first insulating layer (125) has very few dopants and prevents electrical current from flowing between the two electrodes (110, 115). A second highly doped layer (120) is conductive and serves as a source of dopants which can be moved into the first insulating layer (125) to change the overall electrical conductivity of the memristive matrix (105). Consequently, in the configuration illustrated in FIG. 1A, the memristive device (100) is open.

Figure 1B:
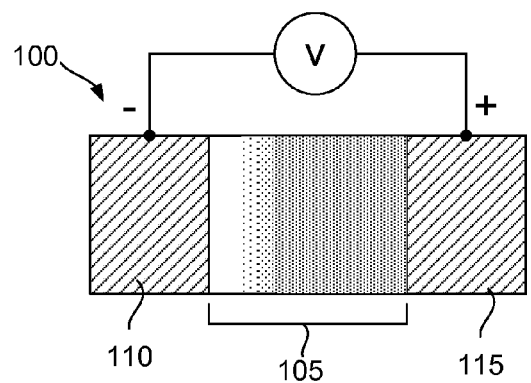

FIG. 1B illustrates the movement of dopants from the highly doped region (120) into the intrinsic region (125) as a result of an applied electrical field. The polarity and voltage difference which is applied across the memristive matrix (105) may vary according to a variety of factors including, but not limited to: material properties, geometry, dopant species, temperature, and other factors. A negative voltage may also be applied to the left electrode (110) to further increase the electrical field and draw the positively charged vacancies toward the left electrode (110).

Figure 1C:
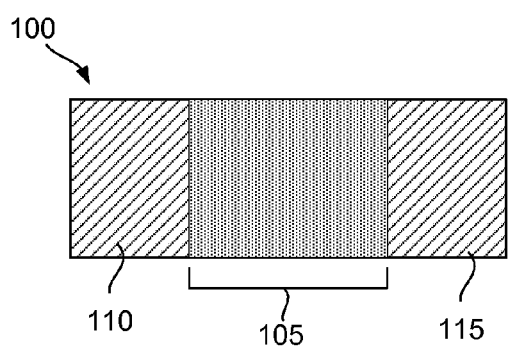

FIG. 1C illustrates the memristive device in the fully "ON" position, with the dopants fully distributed throughout the memristive matrix (105). The left and right electrodes (110, 115) are electrically connected and can pass lower voltage electrical signals through the memristive matrix (105). As discussed above, the location and distribution of the dopants can remain stable over long periods of time or until another programming voltage is applied. The memristive matrix (105) is not a perfect conductor and still interposes an electrical resistance between the two electrodes (110, 115) in the fully "ON" state. This electrical resistance may be influenced by a variety of factors, including, but not limited to the geometry of the memristive matrix and the electrodes, the dopant concentration, the distribution of the dopants throughout the memristive matrix, the species of dopant, the electrical characteristics of the matrix material, the temperature of the device, and other factors.

Figure 1D:
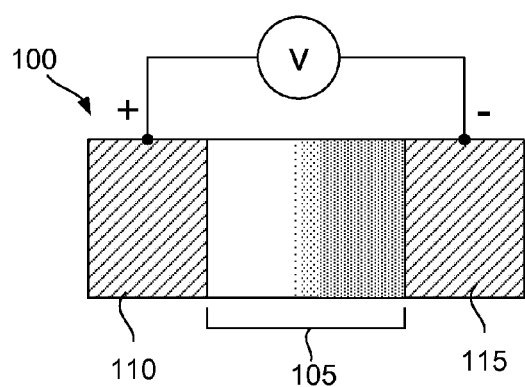

FIG. 1D illustrates the application of a programming voltage to the memristive device (100). In this case, the purpose of the programming voltage is to return the memristive device (100) to the fully "OFF" configuration similar to that illustrated in FIG. 1A. Consequently, the applied programming voltage has an opposite polarity from that illustrated in FIG. 1B. A positive voltage is applied to the left electrode (110) and negative voltage is applied to the right electrode (115), thereby driving the dopants toward the right electrode (115). This returns the left most portion of the memristive matrix (105) to its intrinsic and insulating state. The memristive device (100) is then in a fully "OFF" configuration.

The transition from the fully "OFF" to fully "ON" configuration or visa versa, is not instantaneous, but can have a number of intermediate states in which the memristive matrix acts as a finite resistance between the two electrodes. These intermediate states may be produced by varying the programming voltage applied across the two electrodes (110, 115) and/or varying the time period during which the programming voltage is applied.

The memristive device (100) illustrated in FIG. 1 may be particularly useful as an analogue to a biological synapse. For example, a connecting wire and left electrode (110) could be analogous to an axon which carries an electrical impulse to a synapse. The matrix (105) could represent the synaptic cleft with the right electrode (115) representing the electrical connection between the dendritic spine and its associated neuron.

The memristive device (100) illustrated in FIG. 1 is only one example of a memristor. A variety of other memristor configurations could be constructed. For example, it may be desirable for memristive device to exhibit a more complex response to external stimulus. If a memristive device is intended to simulate chemical synapses, it may be desirable for the memristive device to have more than one state variable. By including more than one state variable, the memristive device can more closely simulate higher level synaptic functions such as desensitization, homosynaptic or hetrosynaptic plasticity, integration of synaptic inputs, pharmacological intervention, and other functions. By way of example and not limitation, these additional state variables may be created within a memristive device by including more than one dopant species within the memristive matrix, by including more than one type of memristive matrix in a memristive device, creating multiple electrodes which contact the memristive matrix, or through other methods.

Figure 2:
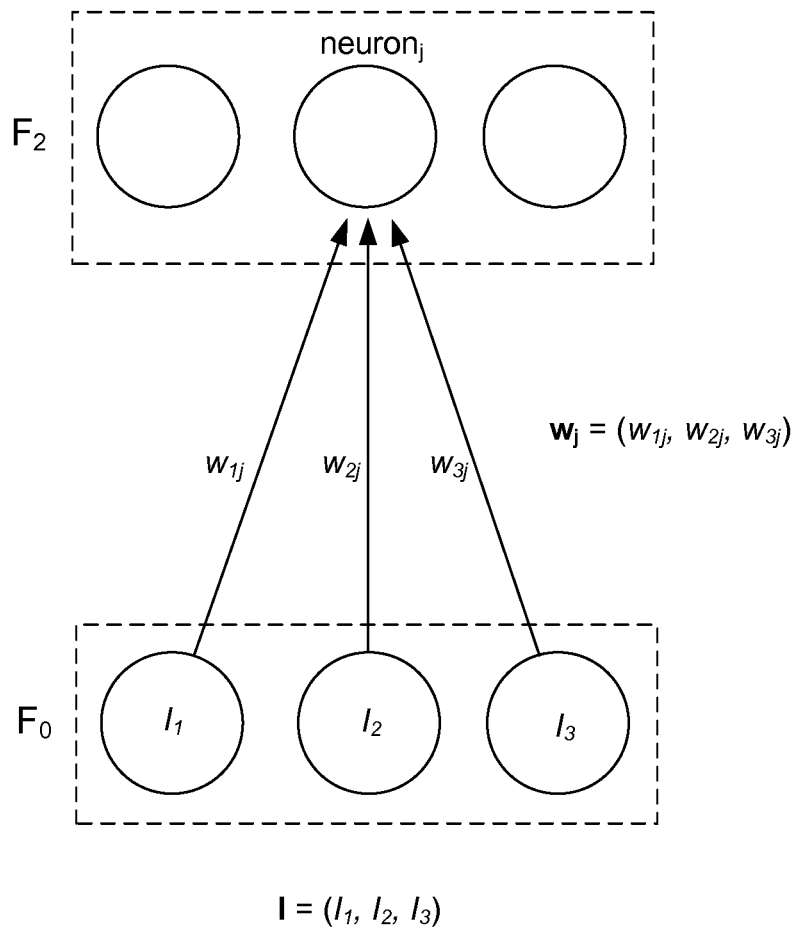
FIG. 2 is a diagram of an illustrative artificial neural network, according to one embodiment of principles described herein.

As discussed above, one example of a neural network architecture which could be used in conjunction with memristors is a mART network. FIG. 2 is a diagram of a portion of an illustrative mART network. For purposes of discussing fundamental concepts of the illustrative mART network, the diagram of FIG. 2 has been simplified. mART networks are modeled as directed graphs, with nodes corresponding to neurons and edges corresponding to synapses. In FIG. 2, the nodes are illustrated as circles and the edges are illustrated as arrows which show directional communication between the neurons. A synapse (represented by an edge) relays signals from its source node to its destination node with the transfer function:

$$s = wx \qquad \text{Eq. 1}$$

where s is the signal received by the destination node, w is the conductive state or "weight" of the synapse, and x is the signal sent by the source node. According to one illustrative mART implementation, x is binary, restricted to the values 0 and 1, and w is a real number restricted to the interval [0, 1]. The synapse weight, w, evolves in time as a function of the source signal, x, and the state of the destination neuron, y:

$$\frac{dw}{dt} = f(w, x, y) \qquad \text{Eq. 2}$$

In mART, y (along with x) is a binary variable. Eq. 2 is called the learning law for a synapse. According to one illustrative embodiment, the neurons (represented by circles) are created from a combination of CMOS circuitry and memristive elements. The edges (represented by arrows) are constructed from memristive elements. The weight ($w_j$) of a given edge corresponds to the internal electrical conductance of the memristive synapse. For example, a memristive synapse may have a low conductance (high electrical resistance) due to the distribution of dopants. When the memristive synapse receives an input (I), it would only transmit a very small signal to the neuron attached to the other side of the synapse. Thus the weight ($w_j$) would be a small value, with the transmitted signal being the product of the weight times the input signal.

As shown in FIG. 2, each receiving neurons in F2 (indexed by j) can be connected to a number of transmitting neurons in F0 (indexed by i). When a non-zero input vector, I, is presented to F0, the center neuron receives the net excitatory signal $$I \cdot w_j = \sum_i I_j w_{ij} \qquad \text{Eq. 3}$$

For example, the input vector I may contain three binary values (1, 1, 0). The respective neurons in F0 receive their corresponding input value and transmit the value through their corresponding memristive synapses which have weights of $w_{1j}$, $w_{2j}$, and $w_{3j}$. According to one illustrative embodiment, the memristive synapses in their lowest conductance state are almost perfect insulators (w≈0.0). In their highest conductive state, the memristive synapses may still have some residual resistance (w≈1.0). For convenience we normalize their maximum conductance to 1. Consequently, synapse weights range between d and 1, where d is a small, positive number less than 1. For example, the synapse weights [w1j, w2j, w3j] may be [0.9, 0.5, 0.6]. Assuming I=(1, 1, 0) and using Eq. 3, the center synapse would then receive a net excitatory signal from the three transmitting neurons of 1*0.9+1*0.5+0*0.6=1.4.

Figure 3:
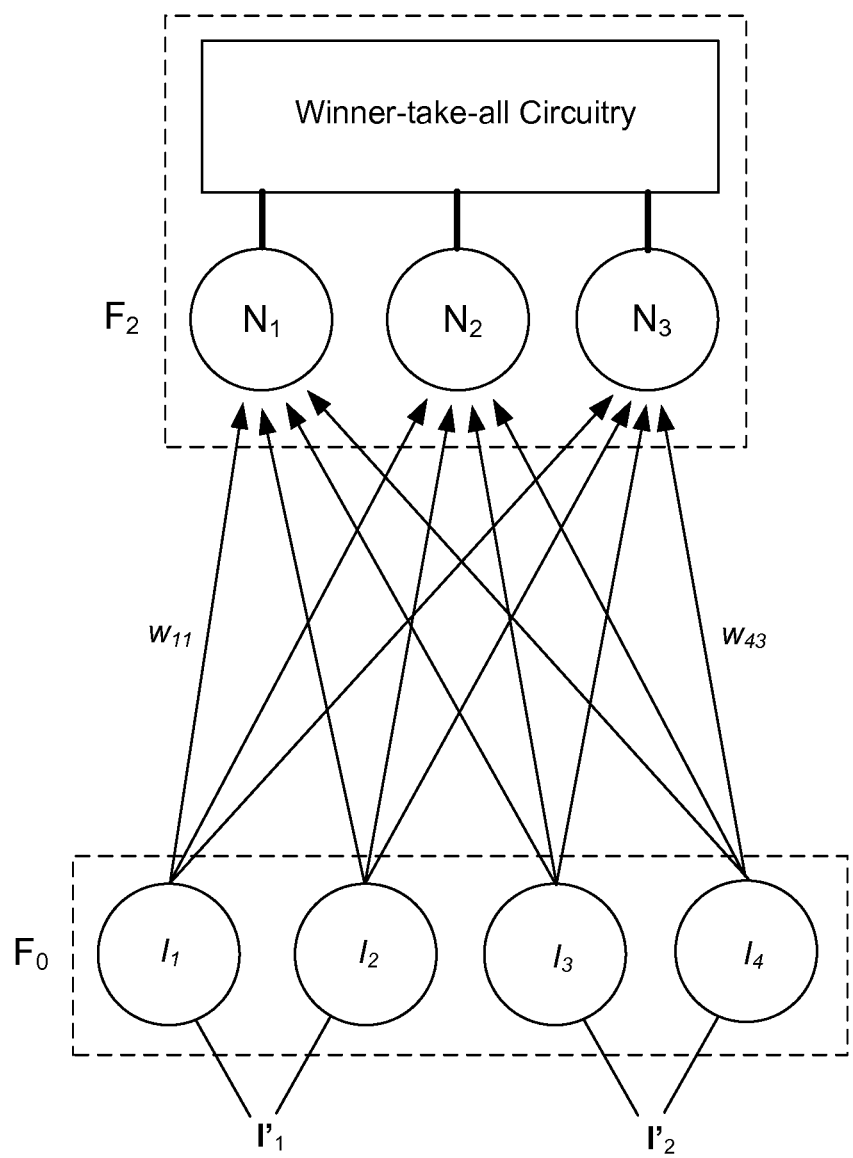
FIG. 3 is a diagram of an illustrative artificial neural network, according to one embodiment of principles described herein.

FIG. 3 is a diagram of an illustrative mART network which shows a more complete view of interactions between the various neurons in the network. In a neural network, each neuron may be synaptically connected to a number of other neurons and may be able to both receive and transmit signals along any of its synaptic connections. Consequently, the designation of a neuron as a transmitting or receiving neuron is arbitrary and is used for convenience in illustrating and describing the neural network.

In this diagram, each of the input neurons F0 are shown as being connected to each of the receiving neurons F2. An input vector, I (composed of subvectors $I_1$' and $I_2$'), is received by the transmitting neurons in F0, which then transmit the received signals along the various synapses [$w_{11}$ ... $w_{43}$] to the receiving neurons $N_1$, $N_2$, and $N_3$. The each of the receiving neurons receives a net excitatory signal as described by Eq. 3.

Each of the neurons in F2 possesses internal state that is a function of the history of all received signals. Each neuron also emits a binary output signal that depends on the neuron's current internal state and all currently received signals. The F2 neurons are interconnected to fight each other in a winner-take-all competition. At the conclusion of the competition, the sole winning neuron will output a 1 signal, and the losers will each output 0. The winning neuron is determined by two functions called match and choice. The match function is defined as $$S_j(I) = \frac{I \cdot w_j}{|I|} \qquad \text{Eq. 4}$$

The match function scales the net excitatory signal $I \cdot w_j$ by the total magnitude |I| of the input vector. The choice function is defined as $$T_j(I) = \frac{I \cdot w_j}{\alpha + |w_j|} \qquad \text{Eq. 5}$$

where I is the input vector, $w_j$ is the synaptic weight vector, and α is a small constant. The choice function scales the net excitatory signal by the magnitude of the weight vector. This levels the playing field in the winner-takes-all competition so that receiving neurons which happen to be connected to transmitting neurons by synapses with high weighting coefficients do not automatically and repeatedly win the competition.

The winner of the competition is the neuron in F2 with maximum Tj that also satisfies the match constraint equation:

$$S_j(I) \geq \rho \quad \text{Eq. 6}$$

where $\rho$ is an externally defined parameter known as the "vigilance" ($0 \leq \rho \leq 1$). The winner's synaptic weights, $w_j$, undergo a learning process that drives the weights towards a state that more closely matches the input pattern, I. The $\alpha$ constant in Eq. 5 is used to solve a problem in distinguishing two patterns where one pattern is a subset of the other.

One of the challenges in implementing the mART network is to make the calculations required in Eq. 4 and Eq. 5 with locally available information in local circuitry.

The denominator of Eq. 4 is the magnitude of the input vector, I. The input vector is not known in advance and may be made up of a wide range of values. For an input vector in a binary system, each value in the input vector could be either a 1 or a 0. Without further information, the total magnitude of the input vector is not locally known at any receiving neuron. However, by compliment coding the input vector, additional information can be provided which will permit the local calculation of the magnitude of the input vector.

Complement coding of inputs in F0 makes calculating the vector magnitude straightforward. In compliment coding, each binary input bit is paired with a second bit that is its logical complement. Thus an original input I with M components is transformed to $(I_1, 1-I_1, I_2, 1-I_2, \ldots, I_M, 1-I_M)$.

Figure 4:
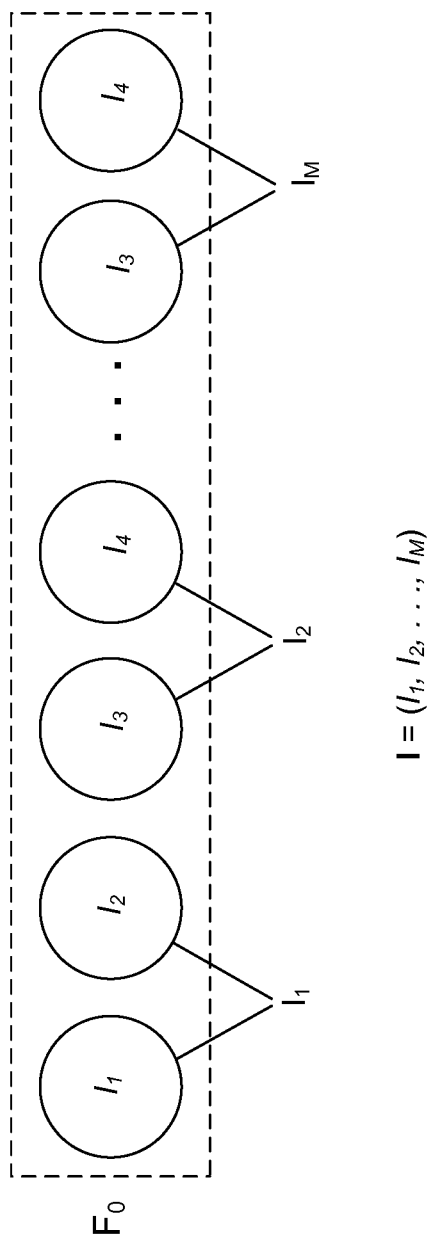
FIG. 4 is a diagram showing complimentary coding of a binary input vector, according to one embodiment of principles described herein.

FIG. 4 illustrates the complimentary coding of an input vector I into neurons within F0. Returning to the example above, the input vector I is (1,1,0) and the complimentary coding of this vector is (1,0,1,0,0,1) where each of the input bits is paired with its logical complement.

This normalizes the input vector, since it guarantees that exactly M of the 2M bits will be 1's and the remainder 0's. Because the length of the complimentary coded input vector is known (2M), M is also known. According to one illustrative embodiment, 2M is equal to the number of transmitting neurons.

According to one illustrative embodiment, the hardware implementation of the mART network could be implemented using synchronous circuitry. In this implementation, the mART network moves through time in a series of steps which are dictated by clocking cycles. Actions are taken in the various clocking cycles to determine various states of the neurons which make up the mART network.

According to one illustrative embodiment, each F2 neuron contains two state variables. The first state variable, $acc_j$, can be thought of as a simple integrator that sums incoming, weighted spikes, thus computing $I \cdot w_j$, which is the numerator of the both Eq. 4 and Eq. 5. This operates on a timescale of milliseconds, so it can be implemented using a CMOS capacitor.

The second state variable, weightNormj, is a long-timescale variable representing the sum of the synaptic weights driving the neuron. This second state variable is used to control the gain of the sum of weighted input spikes when computing the choice function and represents the $|w_j|$ value in the denominator of Eq. 5. According to one illustrative embodiment, the weightNormj value is stored in a memristive device.

Initially all synaptic weights are high, with small random variations resulting from fabrication, and the neurons are therefore broadly tuned to respond to nearly any pattern. As a neuron starts winning the winner-take-all competition, its synaptic weights start to decrease. To keep the competition fair, its gain is increased by a regulatory process interleaved with normal operation. The result is that all neurons wind up with synaptic weights that effectively are "normalized" by the division by weightNormj, with neurons becoming increasingly sharply tuned as they gradually transition from "uncommitted" to "committed." This could be regarded as synaptic scaling of the second state variable. The "vigilance" parameter $\rho$, which can vary dynamically, controls how sharply tuned a given neuron can be become, and hence the number of categories that are formed by the network.

The neurons in F0 and F2 are clocked with a three-phase clocking protocol, where each clock cycle performs one set of operations in phase 1 ($\phi_1$), a second set of operations in phase 2 ($\phi_2$) and a third set in phase 3 ($\phi_3$). Every R cycles, where R might be a number in the range of, say, 10 to 100, two new clock phases, phase 4 ($\phi_4$), and phase 5 ($\phi_5$), are inserted to do some regulatory functions (the "R" stands for regulatory).

Figure 5:
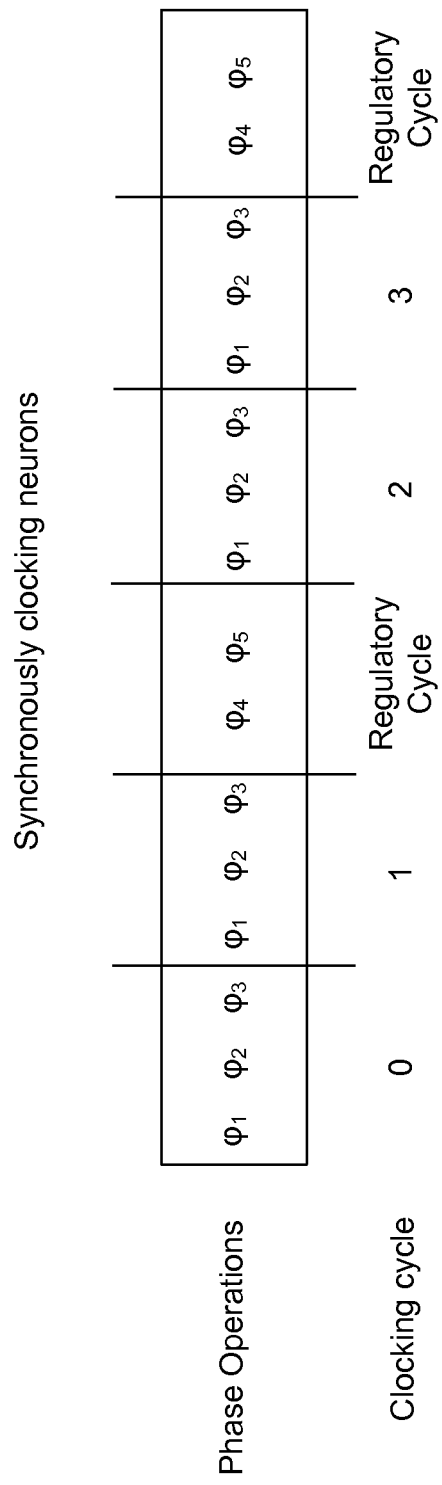
FIG. 5 is a diagram showing phase operations which occur during various clocking cycles, according to one embodiment of principles described herein.

FIG. 5 shows an illustrative timing diagram for R=2. A number of clock cycles are shown along the bottom of the diagram. The phase operations ($\phi$) are shown in a box which is divided by vertical lines. Each division contains the phase operations which take place in during a given clock cycle. For example, in clocking cycle 0, phase operations $\phi_1$, $\phi_2$, and $\phi_3$ occur. During a regulatory cycle, phase operations $\phi_4$ and $\phi_5$ occur.

Each synaptic weight (represented by a memristive device's conductance) is initialized to its maximum value. For convenience, we choose units such that the maximum synaptic weight is 1. Neurons are then initialized by executing a regulatory cycle, described below. Each F2 neuron has a hardwired value, inputNorm, which is the magnitude of the input vector. As discussed above, InputNorm is known at design time because of complement coding.

In phase 1 ($\phi_1$), each F0 neuron sends out a spike to its output synapses if its binary input bit is 1, and sends nothing if its binary input bit is 0. Each F2 neuron collects all such incoming, weighted spikes and sums them in an accumulator. Thus at the end of phase 1, each F2 neuron has computed:

$$acc_j = |I \cdot w_j| \quad \text{Eq. 7}$$

Figure 6A:
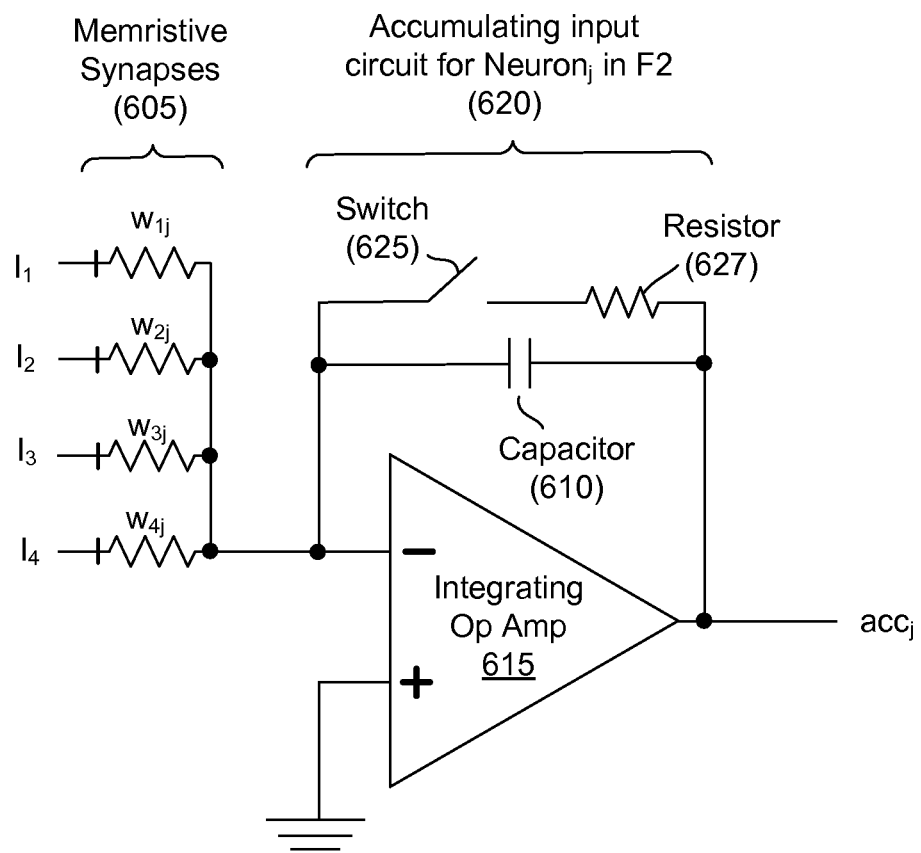
FIG. 6A is an electrical schematic of an accumulator which sums synaptic inputs at a neuron node, according to one embodiment of principles described herein.

An illustrative circuit for which computes $acc_j$ is shown in FIG. 6. The input vector I is received by through the memristive synapses (605) by input accumulator circuit (620) for neuron$_j$ in F2. According to one illustrative embodiment, the accumulator circuit (620) includes an integrator comprising an op amp (615), a capacitor (610) and a switch (625). The positive terminal of the op amp (615) may be tied to ground. The negative terminal of the op amp (615) is tied to memristive synapses (605), the switch (625) and the capacitor (610). According to one illustrative embodiment, the switch (625) is used to discharge the capacitor and to reset the operation of the input circuit (620). The output of the integrating op amp (615) is the value accj.

In phase 4 ($\phi_4$) all F0 neurons are forced to spike unconditionally, thus driving each F2 accumulator, accj, to the value $|w_j|$. In phase 5 ($\phi_5$), the value accj (or a function of it) is stored in a memristive device within the neuron circuitry, and the accumulator, accj, is reset. Thus, at the end of a regulatory cycle, each F2 neuron has computed:

$$weightNorm_j = |w_j| \quad \text{Eq. 8}$$

In phase 2 ($\phi_2$), each F2 neuron, $N_j$ computes the match and choice functions using internal state and also computes output function, output$_j$:

$$S_j = \frac{acc_j}{inputNorm_j} \quad \text{Eq. 9}$$

$$T_j = \frac{acc_j}{\alpha + weightNorm_j} \quad \text{Eq. 10}$$

$$output_j = -1 \quad \text{if } S_j < \rho \quad \text{Eq. 11}$$
$$\quad\quad\quad\, = T_j \quad \text{if } S_j \geq \rho$$

The value $\rho$, the vigilance parameter, is supplied by external circuitry and may be varied dynamically in the range [0, 1]. The $\alpha$ parameter is typically a very small number and, according to one illustrative embodiment, may be zero. The remainder of phase 2 ($\phi_2$) is a winner-take-all competition between the output$j$ values of the F2 neurons. Exactly one F2 neuron will win the competition.

Figure 6B:
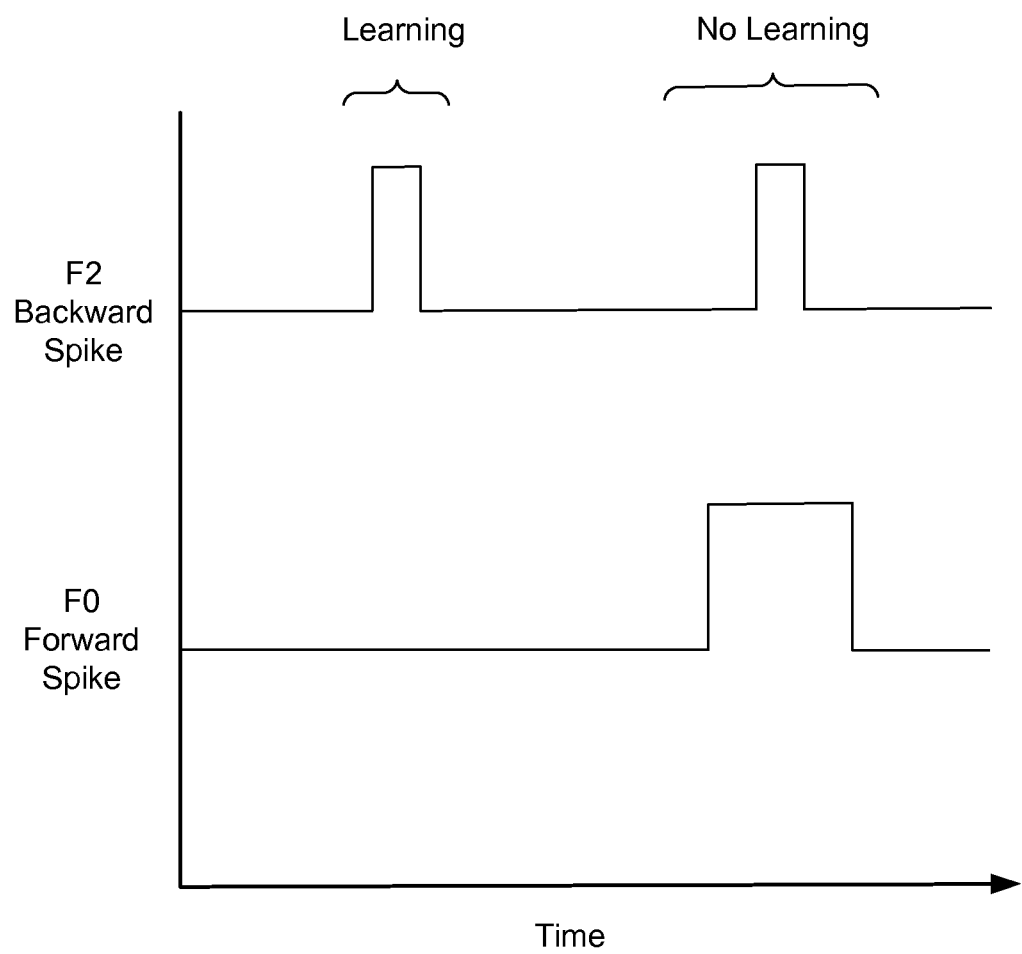
FIG. 6B is a diagram of illustrative destructive interference method for synapse learning, according to one embodiment of principles described herein.

In phase 3 ($\phi_3$), learning occurs only in the winning F2 neuron. FIG. 6b describes one illustrative embodiment of learning by "destructive interference" of spikes between pre- and post-synaptic neurons. During this phase, each F0 neuron retransmits the spike it transmitted in phase 1 (if it had, in fact, transmitted a spike in phase 1), and the winning F2 neuron sends a spike of the same polarity backwards. If the two spikes overlap, no learning takes place. However, if only the winning F2 neuron spikes on a given synapse, the conductivity of the synapse connected to the F0 non-spiking neuron will slightly decrease. This weakens the connection between the winning neuron and the non-spiking neurons by reducing the weighting (w) of the synapses which connect the winning neuron to the non-spiking neurons. This weakening of connections to non-spiking neurons is a form of negative learning which tunes the neuron to be receptive to an input pattern or vector.

Figure 7:
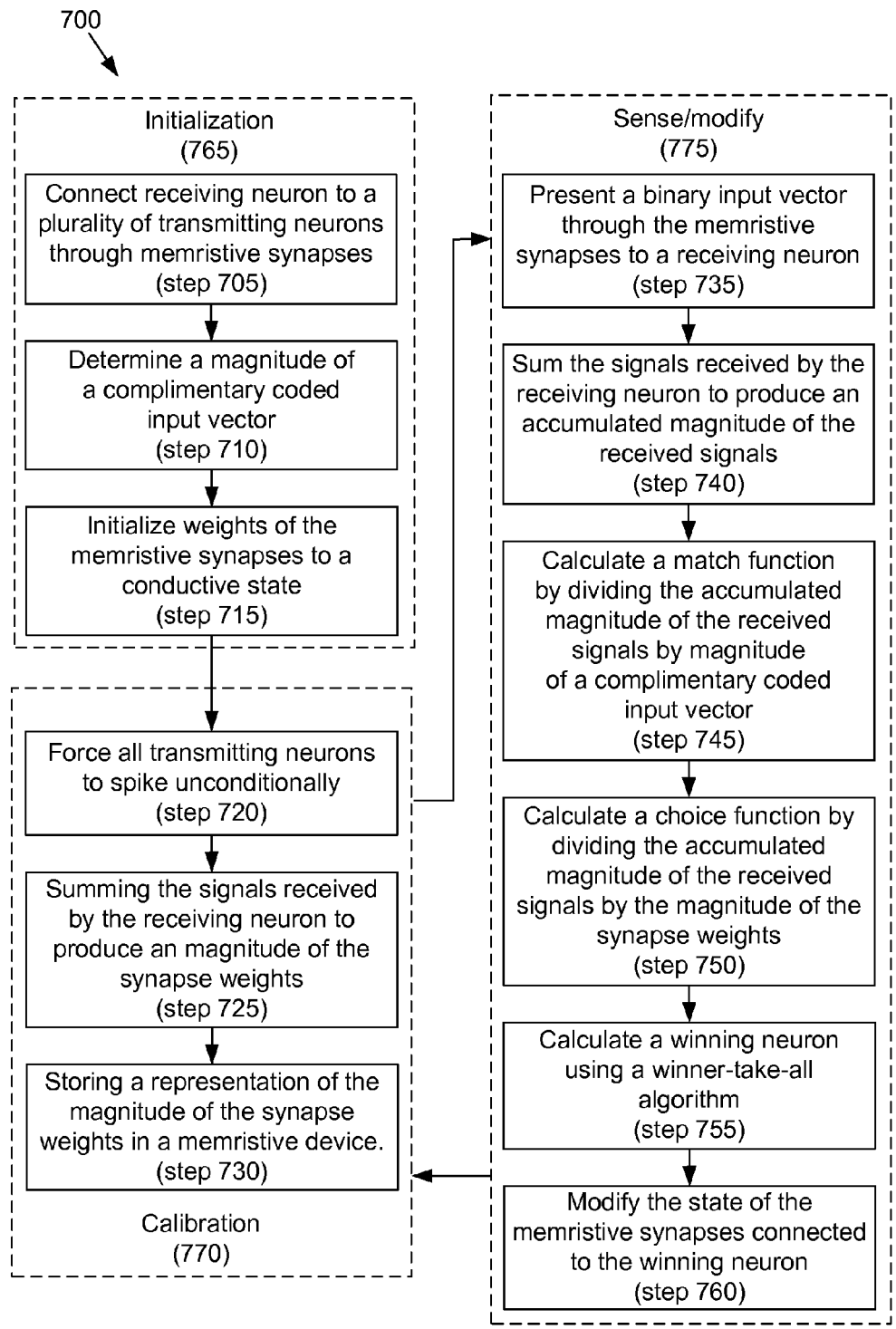
FIG. 7 is a flow chart which shows one illustrative method for implementing a memristive adaptive resonance neural network, according to one embodiment of principles described herein.

FIG. 7 is a flow chart of an illustrative method for implementing an artificial neural network (700). According to one illustrative embodiment, a number of initialization steps (765) occur before the learning operations within the neural network begin. A first step may include connecting a receiving neuron to a plurality of transmitting neurons through memristive synapses (step 705).

A magnitude of a complimentary coded input vector (inputNorm=|I|) is then determined (step 710). As described above, the magnitude of the complimentary coded input vector may be related to the number of transmitting neurons and may be a fixed value for a given receiving neuron which is connected to fixed number of transmitting neurons.

The weights of the memristive synapses are initialized to a conductive state (step 715). According to one illustrative embodiment, this may include distributing the mobile dopants within the memristive matrix so that a highly conductive electrical path is created between the two electrodes.

All transmitting neurons are forced spike unconditionally, thereby sending a high electrical pulse through all memristive synapses connected to the receiving neuron (step 720). The electrical signals received by the receiving neuron are summed to produce a magnitude of the synapse weights (weightNorm$_j$=|w$_j$|) (step 725). According to one illustrative embodiment, the magnitude of the synapse weights is stored in a memristive device which is separate from the memristive devices which make up the synapses. In a synchronous architecture, the above calibrations steps (770) can be performed during regulatory cycles, which may be periodically spaced through the clocking cycles.

According to one illustrative embodiment, a binary input vector (I) is presented through the memristive synapses to a receiving neuron (step 735). As discussed above, the binary input vector may be complimentary coded. The signals received by the receiving neuron are summed to produce an accumulated magnitude of the received signals (acc$_j$←|I·w$_j$|) (step 740).

The match function ($S_j$) is calculated by dividing the accumulated magnitude of the received signals by magnitude of a complimentary coded input vector (step 745). The choice function ($T_j$) is calculated by dividing the accumulated magnitude of the received signals by the magnitude of the synapse weights (step 750).

The winning neuron among a plurality of receiving neurons is calculated using a winner-take-all algorithm (step 755). According to one illustrative embodiment, an output$_j$ function is generated by each of receiving neurons and compared to determine the winning neuron. The synapses of the winning neuron are then altered to distance winning neuron from transmitting neurons which did not transmit a high signal during the winning round (step 760). According to one illustrative embodiment, learning takes place by "destructive interference" which weakens the connection (i.e. increases the electrical resistance) between the winning neuron and the non-spiking neurons by reducing the weighting (w) of the synapses which connect the winning neuron to the non-spiking neurons.

The sense/modify steps (775) may be looped through a number of iterations and periodically return to the calibration steps (770), as shown by the arrow connecting the sense/modify steps (755) to the calibration steps (770). According to one illustrative embodiment, the memristive adaptive resonance network is operated synchronously with interleaved clock cycles, as shown in FIG. 5. The sense/modify steps (775) take place during one clock cycle and the calibration steps (770) take place during an interleaved regulatory clock cycle. This regulatory clock cycle may occur periodically, such as every 10 or 100 sense/modify clock cycles. Additionally or alternatively, the calibration steps (770) may occur infrequently during periods when the neural network is relatively stable, but may occur more frequently when large changes in synapse weights occur.

The method described above is only one illustrative example. A method for implementing memristive adaptive resonance networks could take a number of embodiments, including embodiments which have different steps, different step orders, or omit steps described above.

Chart 1, below, summarizes notation and an illustrative method for implementing memristive adaptive resonance networks.

CHART 1

Notation:
    $w_{min}$ : minimum synaptic weight ($0 < w_{min} < 1$)
    1 : maximum synaptic weight
    M : number of bits in input pattern, before complementary coding
    N : number of neurons in $F_2$
    $\rho$ : vigilance parameter (may be dynamic)
    $w_j$ : synaptic weight vector driving neuron j in $F_2$ (2M weights)
    I : input pattern, with complementary coding (2M binary values)
$F_2$ neuron state variables:
    weightNorm$_j$ ← |w$_j$|    // every R cycles (regulatory)
    acc$_j$ ← |I · w$_j$|    // phase 1 and phase 4
Initialize:
    for i in 1 to 2M; j in 1 to N
        $w_{ij}$ = 1
        weightNorm = |w$_j$|    // regulatory process
Loop:
    present input I (complementary coding)
    // phase 1: accumulate spikes
    for j in 2 to N CHART 1-continued

```
    acc_j = I · w_j
// phase 2: match, choice, winner-take-all competition
for j in 2 to N
    S_j = acc_j / inputNorm_j
    T_j = acc_j / (α + M)
    output_j = if (S_j > ρ ) T_j else −1
winner = argmax_j(output_j)
// phase 3: learn
w_winner = w_winner − δ (1 − I) // stops at w_min
```

In sum, a memristive adaptive resonance neural network may use memristive devices in a number of ways to simplify and economically create a neural network. The memristive devices may be used to store long term state variables or other information and may be used as synapses between nodes. To calculate the magnitude of the weights of the memristive synapses, a high signal may be transmitted through all memristive synapses and summed at the receiving neuron. This allows the neuron to calculate scaling or normalizing functions using only locally available data. In one embodiment, the memristive adaptive resonance neural network may synchronously operate over a number of interleaved clock cycles, with the magnitude of the weights of the memristive synapses being calculated periodically during a regulator cycle.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for implementing an artificial neural network comprises:
   connecting a plurality of receiving neurons to a plurality of transmitting neurons through memristive synapses, each memristive synapse having a weight;
   initializing weights of the memristive synapses to a conductive state;
   presenting a input vector through the memristive synapses to the plurality of receiving neurons; and
   modifying the state of one or more of the memristive synapses based on the input vector.

2. The method according to claim 1, further comprising:
   forcing all transmitting neurons to spike unconditionally, thereby sending a high electrical pulse through all memristive synapses connected to a receiving neuron; and
   summing the signals received by the receiving neuron to produce a magnitude of the synapse weights.

3. The method according to claim 2, further comprising storing a representation of the magnitude of the synapse weights in a memristive device.

4. The method according to any of the above claims, in which the input vector is a complimentary coded binary input vector.

5. The method according to claim 4, further comprising determining a magnitude of a complimentary coded input vector, the magnitude of the complimentary coded input vector remaining constant for a given synaptic configuration.

6. The method according to claim 5, further comprising:
   summing the signals received by a receiving neuron to produce an accumulated magnitude of the received signals;
   calculating a match function by dividing the accumulated magnitude of the received signals by the magnitude of the complimentary coded input vector; and
   calculating a choice function by dividing the accumulated magnitude of the received signals by the magnitude of the synapse weights.

7. The method according to claim 1, further comprising operating the artificial neural network within a synchronously timed architecture.

8. The method according to claim 7, further comprising:
   calculating the magnitude of the synapse weights during a regulatory clock cycle;
   calculating a winning neuron using a winner-take-all algorithm during an alternate clock cycle, in which the regulatory clock cycle and the alternative clock cycle are interleaved; and
   modifying the state of the memristive synapses connected to the winning neuron by redistributing mobile dopants within the memristive synapses.

9. A method for implementing an artificial neural network comprises:
   connecting a plurality of receiving neurons to a plurality of transmitting neurons through memristive synapses, each memristive synapse having a weight;
   forcing all transmitting neurons to spike unconditionally, thereby sending a high electrical pulse through all memristive synapses connected to the plurality of receiving neurons; and
   summing the signals received by the plurality of receiving neurons to produce a magnitude of the synapse weights for each of the plurality of receiving neurons.

10. The method according to claim 9, further comprising storing a representation of the magnitude of the synapse weights for each receiving neuron in a separate memristive device.

11. The method according to any of claim 9 or 10, further comprising
    initializing weights of the memristive synapses to a conductive state;
    presenting a binary input vector through the memristive synapses to the receiving neuron;
    calculating a winning neuron using a winner-take-all algorithm; and
    modifying the state of the memristive synapses connected to the winning neuron.

12. The method according to any of claim 9, 10 or 11, further comprising operating the artificial neural network within a synchronously timed architecture.

13. The method according to claim 12, further comprising:
    calculating the magnitude of the synapse weights during a regulatory clock cycle; and
    calculating a winning neuron during an alternate clock cycle, the regulatory clock cycle and the alternative clock cycle being interleaved.

14. The method according to claim 13, in which modifying the state of the memristive synapses connected to the winning neuron comprises increasing the electrical resistances of synapses between the winning neuron and transmitting neurons which did not transmit a signal during a current clock cycle.

15. A method for implementing an artificial neural network comprises:
    connecting a receiving neuron to a plurality of transmitting neurons through memristive synapses;
    determining a magnitude of a complimentary coded input vector;
    initializing weights of the memristive synapses to a conductive state;
    forcing all transmitting neurons to spike unconditionally, thereby sending a high electrical pulse through all memristive synapses connected to the receiving neuron;

summing the signals received by the receiving neuron to produce a magnitude of the synapse weights;
storing a representation of the magnitude of the synapse weights in a memristive device;
presenting a complimentary coded binary input vector through the memristive synapses to a receiving neuron;
summing the signals received by the receiving neuron to produce an accumulated magnitude of the received signals;
calculating a match function by dividing the accumulated magnitude of the received signals by magnitude of a complimentary coded input vector;
calculating a choice function by dividing the accumulated magnitude of the received signals by the magnitude of the synapse weights;
calculating a winning neuron using a winner-take-all algorithm; and
modifying the state of the memristive synapses connected to the winning neuron using a destructive interference of spikes between the plurality of transmitting neurons and the receiving neurons by decreasing the conductance of memristive synapses which are connected between the receiving neuron and non-spiking neurons.

* * * * *